United States Patent
Gilbertson

[11] Patent Number: 6,015,050
[45] Date of Patent: Jan. 18, 2000

[54] MODULAR STORAGE SYSTEM

[76] Inventor: Mark D. Gilbertson, 19070 Easton Rd., Deephaven, Minn. 55391

[21] Appl. No.: 08/741,652

[22] Filed: Oct. 31, 1996

[51] Int. Cl.[7] .................................................... A47G 29/00
[52] U.S. Cl. .............................. 211/40; 211/188; 211/194
[58] Field of Search .............................. 211/194, 40, 188, 211/133.1; 403/361, 292, 298, 384, 386; 312/9.9, 9.47, 9.53; 108/91, 180

[56] References Cited

U.S. PATENT DOCUMENTS

| | | |
|---|---|---|
| D. 362,365 | 9/1995 | Real et al. . |
| D. 364,066 | 11/1995 | Haskett et al. . |
| D. 367,796 | 3/1996 | Ozeki . |
| 3,606,023 | 9/1971 | Edmunds .............................. 211/194 X |
| 4,940,150 | 7/1990 | Spengler ........................... 211/133.1 X |
| 5,048,680 | 9/1991 | Fitzpatrick . |
| 5,052,564 | 10/1991 | Zuzack . |
| 5,072,836 | 12/1991 | Gross ......................................... 211/40 |
| 5,172,817 | 12/1992 | Gross ......................................... 211/40 |
| 5,411,153 | 5/1995 | Unfried ................................ 211/194 X |
| 5,415,296 | 5/1995 | Wright . |
| 5,462,177 | 10/1995 | O'Donnell . |
| 5,497,889 | 3/1996 | Genovesi . |
| 5,518,125 | 5/1996 | Colosimo . |
| 5,533,614 | 7/1996 | Walker . |

FOREIGN PATENT DOCUMENTS 212214  4/1960  Austria ................................... 211/188

*Primary Examiner*—Ramon O. Ramirez
*Assistant Examiner*—Gwendolyn Baxter
*Attorney, Agent, or Firm*—Merchant & Gould P.C.

[57] ABSTRACT

A modular storage system utilizes pluralities of mutually orthogonal members removably coupled to one another through cooperative male and female connectors to form a lattice structure with a plurality of receptacles for storing articles such as compact disc (CD) jewel boxes and the like. First members include female connectors having at least one aperture through which are coupled a pair of coaxially-oriented second members extending orthogonal thereto. One of the second members includes a pin which is hollowed out to define an aperture suited for receiving the pin of the other second member such that both second members are coupled to one another as well as to the first member. In addition, the female connectors in the first members include a pair of apertures, with male connectors of the second members including pairs of pins suitable for engaging the apertures in the first members. Each second member is capable of engaging either one or two first members with each male connector by engaging the pair of pins either with the pair of apertures from one first member or one aperture for each of two first members.

21 Claims, 4 Drawing Sheets

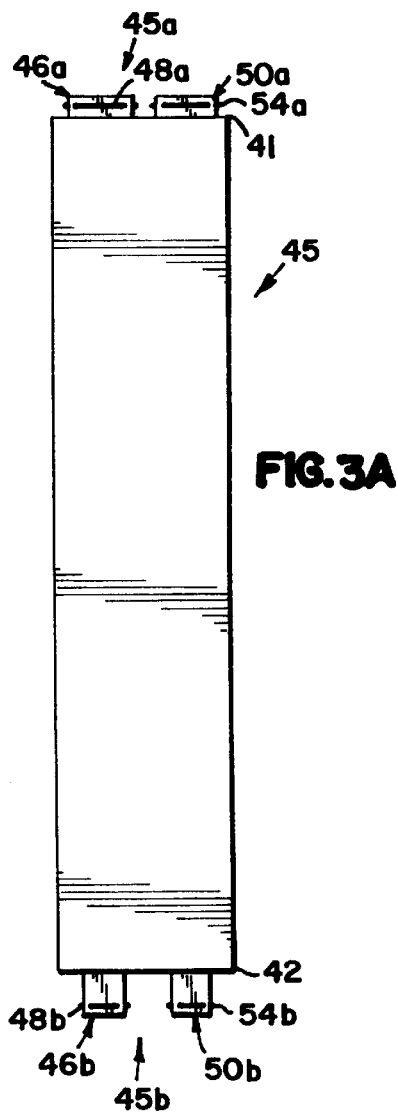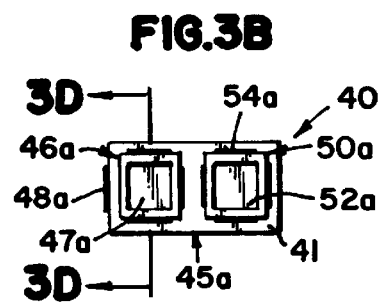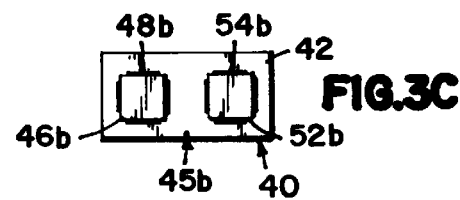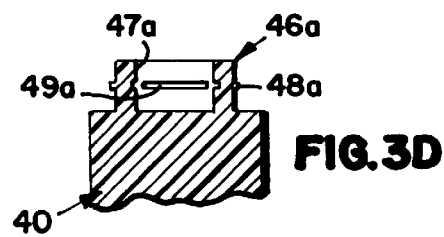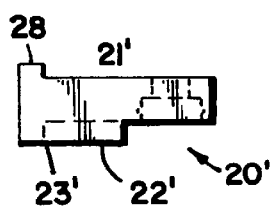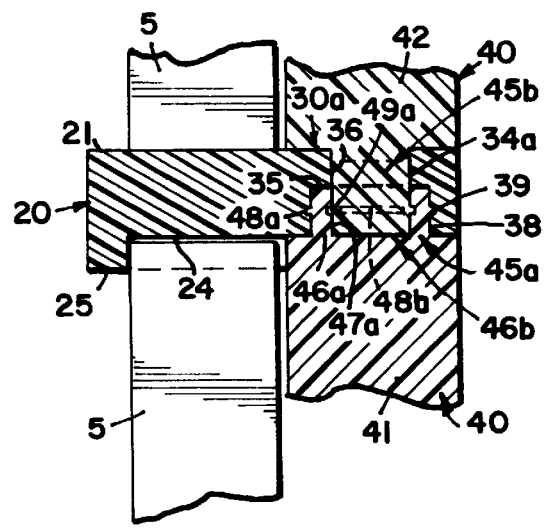

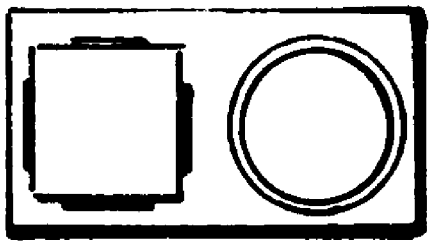
FIG. 3C'
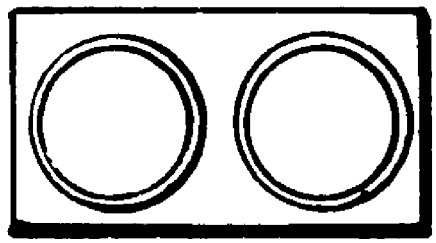
FIG. 3C"

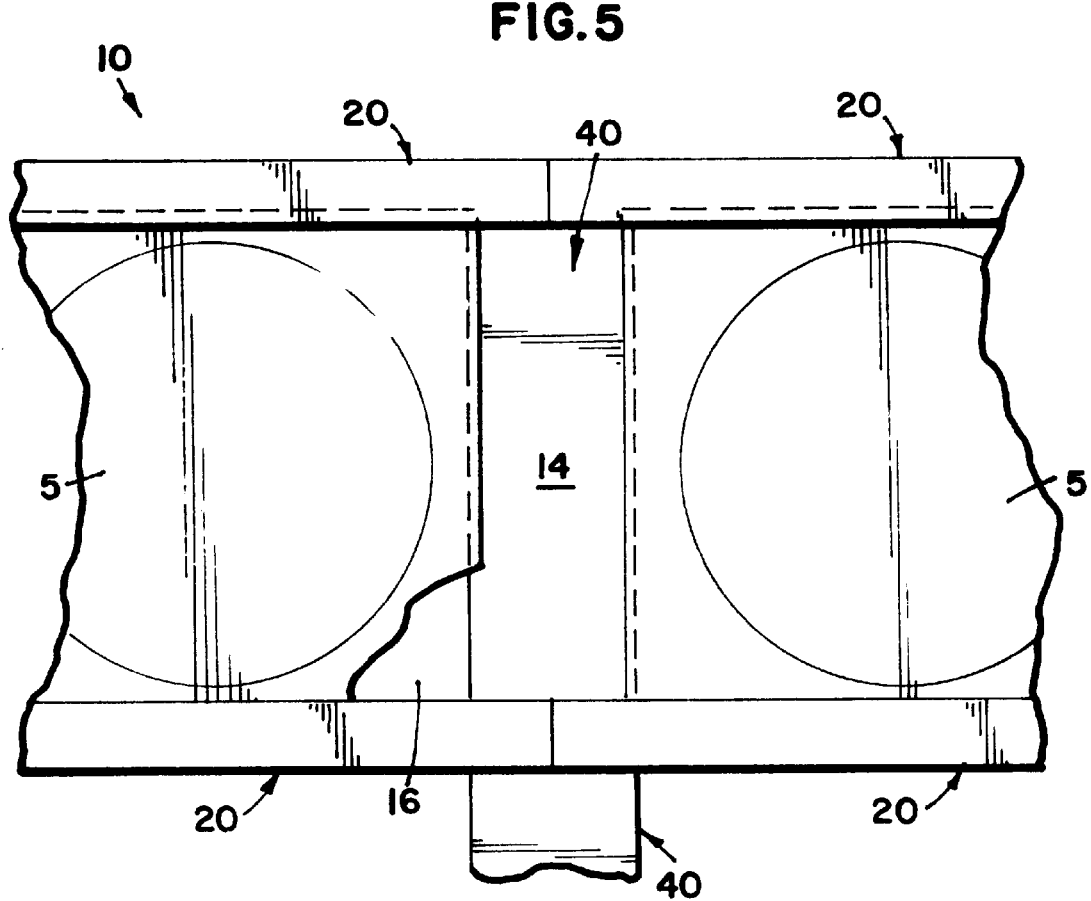

MODULAR STORAGE SYSTEM

FIELD OF THE INVENTION

The invention is generally related to a storage system for storing articles, particularly compact disc jewel boxes, in a manner which displays the front faces of the articles.

BACKGROUND OF THE INVENTION

Compact discs (CD's) have increasingly become the recorded music format of choice for many consumers. Likewise, storage systems for storing CD's have also become increasingly popular, with many different designs becoming available. Similar storage systems have also been developed for other articles such as videotapes, audio cassettes, and books, among others.

For example, a number of storage systems are essentially racks or shelves upon which CD's, housed in their packaging (known as "jewel boxes"), are stored face-to-face with ends thereof visible to a user, similar to the manner in which books are placed on a shelf.

However, as many CD's are packaged with unique and colorful artwork, other storage system designs have been developed to store CD jewel boxes side-by-side with their front faces fully visible to a user. These storage systems may be stand-alone units, or may be supported on a wall or other vertical surface.

Some of these storage system designs provide a single unit with a plurality of receptacles for housing multiple CD jewel boxes. Others provide multiple units, each housing one or more CD jewel boxes, which may be coupled together by separate fasteners to house any number of CD's. One advantage of the latter storage systems is that they may be expanded as a user's CD collection grows.

However, all of the above types of storage systems typically require a number of different components, and often separate fasteners, both of which often require excessive materials and manufacturing steps. Accordingly, the costs of many such storage systems are often inordinately high.

Therefore, a substantial need continues to exist for a storage system for CD's and other articles which provides an aesthetically-pleasing display of the articles in a less complex and less expensive manner.

SUMMARY OF THE INVENTION

The present invention addresses these and other problems associated with the prior art in providing a modular storage system utilizing pluralities of mutually orthogonal members removably coupled to one another through cooperative male and female connectors to form a lattice structure with a plurality of receptacles for storing articles and the like. Any number of members may be utilized in varying configurations to arrange any number of articles into an aesthetically-pleasing display.

In one preferred embodiment of the invention, first members include female connectors having at least one aperture through which are coupled a pair of coaxially-oriented second members extending orthogonal thereto. One of the second members includes a pin which is hollowed out to define an aperture suited for receiving the pin of the other second member such that both second members are coupled to one another as well as to the first member, thereby providing increased rigidity and structural stability in the storage system.

In another preferred embodiment of the invention, the female connectors in the first members include a pair of apertures, with male connectors of the second members including pairs of pins suitable for engaging the apertures in the first members. Each second member is capable of engaging either one or two first members with each male connector by engaging the pair of pins either with the pair of apertures from one first member or one aperture for each of two first members.

Therefore, in accordance with one aspect of the invention, there is provided a modular storage system. The storage system includes a plurality of first members and a plurality of second members. The first and second members extend orthogonal to one another and are removably coupled to one another through cooperative male and female connectors with adjacent first members coupled through at least one second member and adjacent second members coupled through at least one first member. Moreover, the first and second members form a lattice structure including a plurality of article receptacles.

In accordance with another aspect of the invention, there is provided a modular storage system. The storage system includes a plurality of first members, each first member including a female connector proximate opposing ends thereof, each female connector including an aperture extending between upper and lower surfaces of the first member; and a plurality of second members, each second member including a male connector proximate opposing ends thereof, each male connector including a longitudinally-extending pin, with the pin proximate a first end of the second member hollowed out to define an aperture in an end thereof which is sized to receive the pin at a second end of the second member.

According to a further aspect of the invention, there is provided a modular storage system. The storage system includes a plurality of first members, each first member including a female connector proximate opposing ends thereof, each female connector including a pair of apertures longitudinally-spaced from one another; and a plurality of second members, each second member including a male connector proximate opposing ends thereof, each male connector including a pair longitudinally-extending pins, wherein one of the male connectors of each second member selectively engages either one first member with both pins of the male connector engaging both apertures of a female connector on the first member, or two first members with one pin of the male connector engaging one aperture in a female connector on each of the two first members.

These and other advantages and features, which characterize the invention, are set forth in the claims annexed hereto and forming a further part hereof. However, for a better understanding of the invention, and of the advantages and objectives attained by its use, reference should be made to the Drawing, and to the accompanying descriptive matter, in which there is described preferred embodiments of the invention.

BRIEF DESCRIPTION OF THE DRAWING

FIG. 3A is a front elevational view of a second member from the storage system of FIG. 1.

FIG. 3B is a top plan view of the second member of FIG. 3A.

FIG. 3C is a bottom plan view of the second member of FIG. 3A.

FIG. 3D is a cross-sectional view of the second member, taken along line D—D of FIG. 3B.

FIG. 4 is a cross-sectional view illustrating the interconnection between a pair of second members through a first member in the storage system of FIG. 1.

FIG. 5 is an enlarged front elevational view of the storage system of FIG. 1, illustrating the spacing between adjacent articles.

FIG. 6 is a right side elevational view of an alternate second member to the second member of FIGS. 2A–2C.

DETAILED DESCRIPTION OF THE PREFERRED EMBODIMENTS

Figure 1:
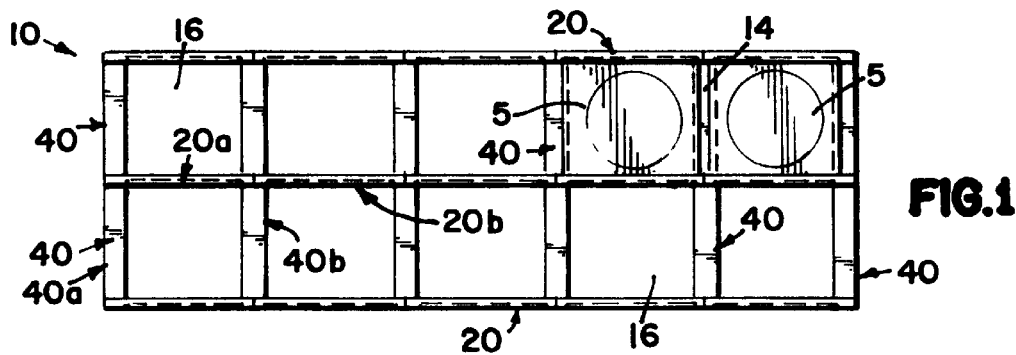
FIG. 1 is a front elevational view of a preferred modular storage system consistent with the principles of the present invention.

Turning to the Drawing, wherein like numbers denote like parts throughout the several views, FIG. 1 shows a preferred modular storage system 10 consistent with the principles of the present invention. Storage system 10 generally includes pluralities of first and second members respectively designated at 20 and 40 (some of which are designated separately as members 20a, 20b and 40a, 40b) and removably coupled to one another through cooperative male and female connectors. Members 20, 40 are preferably unitary members formed of plastic or wood, but may be constructed of other materials.

The arrangement of first and second members 20, 40 provides a lattice structure forming a plurality of receptacles 16 for storing and articles such as CD jewel boxes 5 with their front faces displayed thereby. Spaces or voids 14 are located between adjacent jewel boxes to permit individual jewel boxes to be removed by gripping the boxes at their left and right edges. As will become apparent, members 20, 40 are readily suited for sale in kit form, whereby purchasers would be able to selectively assemble the members to form any number of configurations.

The preferred storage system 10 shown in FIG. 1 is optimized for storing CD jewel boxes, and consequently, the various dimensions of the components in the preferred storage system that are disclosed herein are directed solely to this particular application of the invention. However, it should be appreciated that preferred embodiments of the invention may be useful for storing other types of articles, e.g., books, videotapes, audio cassettes, mini-discs, laser disks, record albums, greeting cards, photographs and paintings, planters and containers for living or artificial plants, collectible items for display, etc. Consequently, the invention should not be limited to any of the preferred dimensions disclosed herein.

Figure 2A:
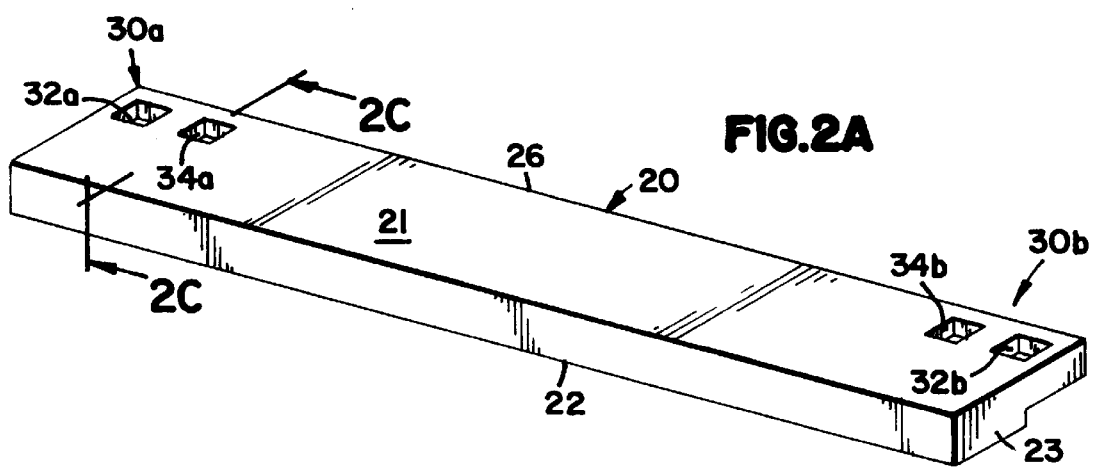
FIG. 2A is a front perspective view of a first member from the storage system of FIG. 1.
Figure 2B:
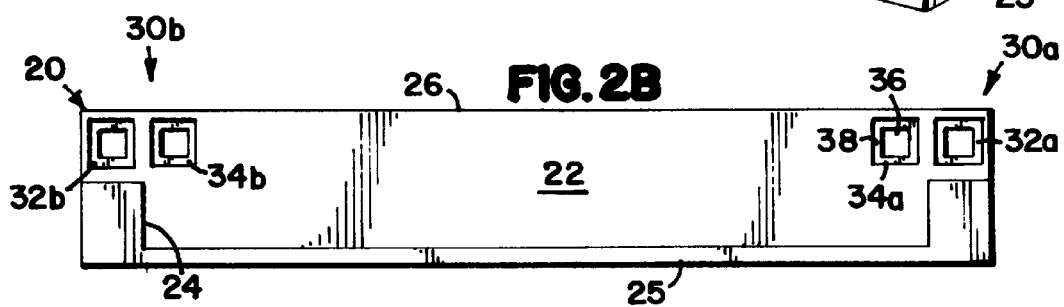
FIG. 2B is a bottom plan view of the first member of FIG. 2A.
Figure 2C:
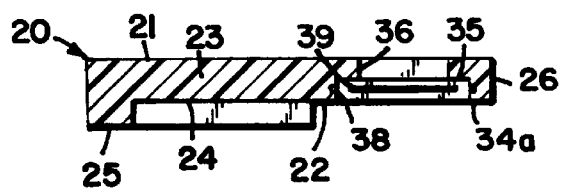
FIG. 2C is a cross-sectional view of the first member, taken along line C—C of FIG. 2A.

As shown in FIGS. 2A–2C, first members 20 are each preferably a horizontally oriented member having an upper surface 21 and a lower surface 22. Each first member 20 is preferably about 6 inches long, about ½ inch thick at its thickest point and about 1 inch deep.

A rear portion 26 is defined in first member 20 upon which is located a pair of female connectors 30a, 30b. A ledge portion 23 is defined forward of rear portion 26 to provide a ledge or shelf upon which an article such as a CD jewel box may rest. Also, as shown in FIG. 2B, a longitudinal recess 24 is defined on lower surface 22 to form a longitudinally-extending lip 25 along a forward edge of first member 20. Recess 24 receives a top edge of an article such as CD jewel box 5, and accordingly, is preferably of sized (about 5½ inches long for a CD jewel box) and positioned to receive and center the article in its associated receptacle. As an alternative, first member 20 may include a plurality of longitudinally-spaced recesses, each suitable for a separate CD jewel box.

Female connectors 30a, 30b are disposed at opposite ends of first member 20. Female connector 30a includes a pair of apertures 32a, 34a and female connector 30b includes a pair of apertures 32b, 34b, all of which are spaced longitudinally along first member 20.

Aperture 34a (which is identically configured to apertures 32a, 32b and 34b) is shown in greater detail in FIG. 2C. The aperture is partially defined by a set of walls 36 extending into first member 20 from upper surface 21 which define a square opening. The aperture is also partially defined by a second set of walls 38 extending into first member 20 from lower surface 21 and which also define a square opening. A shoulder 35 is formed around the aperture joining walls 36, 38. In addition, a series of notches 39 are formed in walls 38.

In the preferred embodiment, the centers of the apertures in each female connector 30a, 30b are preferably spaced twice the distance from the centers of the outer apertures 32a, 32b to the respective proximal ends of first member 20. This arrangement permits the male connector of one second member 40 to selectively couple to either one or two first members, since the separation between outer apertures on adjacent first members is then equal to the spacings between the pair of apertures in each female connector.

Second members 40 are shown in greater detail in FIGS. 3A–3D as generally vertically-oriented members having first (or top) ends 41 and second (or bottom) ends 42. Each second member 40 is preferably about 5 inches long (excluding connectors), about 1 inch wide and about ½ inch deep.

A male connector 45a is disposed at first end 41 of second member 40, including a pair of longitudinally extending pins 46a, 50a. As shown in FIGS. 3B and 3D, pin 46a is hollowed out to form an aperture 47a, as is pin 50a to form an aperture 52a. Pins 46a, 50a are preferably square in cross-section and sized to engage walls 38 of apertures 32a, 32b, 34a, 34b in first member 20. Detents 48a, 54a are disposed on external surfaces of the pins to engage notches 39 in the first member apertures. in addition, notches 49a are defined in apertures 47a, 52a.

Another male connector 45b is disposed at second end 42 of second member 40, including a pair of longitudinally-extending pins 46b, 50b. Pins 46b, 50b are preferably square in cross-section and sized to engage walls 36 of apertures 32a, 32b, 34a, 34b in first member 20, as well as apertures 47a, 52a in pins 46a, 50a of another second member 40. Detents 48b, 54b are disposed on external surfaces of the pins to engage notches 49a in apertures 47a, 52a in pins 46a, 50a. Cooperative detents and notches (not shown) may also be used to engage pins 48b, 54b with walls 36 in first member 20. Moreover, it should be appreciated that the detents may be disposed on either of the aperture walls or pin external surfaces.

To assemble a storage system from first and second members 20, 40, a user simply snaps selected members 20, 40 together through the cooperative male and female connectors. For example, FIG. 4 illustrates the attachment of one first member 20 between a pair of second members 40. To assemble these components, the male connector 45a of one second member 40 is first snapped into female connector 30a of first member 20. Pin 46a projects into aperture 34a through lower surface 22 of first member 20, whereby detents 48a engage notches 39 in aperture walls 38 to secure the members together. Second, male connector 45b of the other second member 40 is snapped into female connector 30a of first member 20, such that pin 46b projects into aperture 34a through upper surface 21 of first member 20, then into aperture 47a of pin 46a, whereby detents 48b engage notches 49a in aperture 47a of pin 46a. It should be appreciated that the sizes of the detents and the relative tolerances between the members may be adjusted to make the members easier or more difficult to snap together and apart.

With the unique configuration shown for members 20, 40, it should be appreciated that only one second member 40 may be secured to a given female connection on a first member through either the upper or lower surface, e.g., as shown in FIG. 1 for the first members 20 disposed along top and bottom rows of storage system 10. For such first members, separate plugs or caps (not shown) may be used to fill visible but unused apertures in the members, either for aesthetic reasons, or for strengthening the engagement with the second member connected thereto.

Moreover, with the unique configuration of members 20, 40, each male connector of a second member 40 may engage the female connectors of either one or two first members 20, typically depending upon whether the second member 40 will form the outside perimeter of the storage system. For example, second member 40a of FIG. 1 is secured at one end to only one first member 20a, whereby pins 46a, 50a (FIG. 3A) of second member 40a respectively engage apertures 32a, 34a (FIG. 2A) of first member 20a. Likewise, second member 40b is secured at one end to two first members 20a, 20b, whereby pin 46a (FIG. 3A) of second member 40b engages aperture 32b (FIG. 2A) of first member 20a, and pin 50a (FIG. 3A) of second member 40b engages aperture 32a (FIG. 2A) of first member 20b.

It should also be appreciated that storage system 10 is a modular system in that any number of first and second members may be used to provide any configuration of article receptacles, whether rectangular, diamond shaped (e.g., with rows of 1, 3, 5, 3, and 1 receptacles), or otherwise. Moreover, due to the removable nature of the connections between members, it should be appreciated that members may be added, removed or rearranged as desired to provide different configurations, or to add additional receptacles as a user's library grows.

Once assembled, storage system 10 may be hung from practically any vertical surface, e.g., walls, doors, windows. Suitable fasteners, such as hooks, suction cups, hook-and-loop material, nails, screws, double-sided tape, etc. may be used to fasten storage system 10 to a vertical surface. Moreover, apertures or hangers may be disposed on rear surfaces of members 20, 40 as desired to provide necessary mounting points for affixing the storage system to a surface. In the alternative, storage system 10 may be hung from a horizontal surface such as a ceiling through suitable fasteners, or may even be secured to a horizontal surface so long as adequate manners of keeping articles from falling out of the system are provided. Storage system 10 may also be free standing through the use of a separate base (not shown).

Insertion of CD jewel boxes into an assembled storage system is illustrated in FIGS. 4 and 5. Generally, a CD jewel box 5 is inserted into a receptacle 16 in storage system 10 by first orienting a top edge of the CD jewel box within recess 24 and behind lip 25 on the first member defining the top edge of the receptacle (as shown in FIG. 4). Next, the bottom edge of CD jewel box 5 is pushed back to preferably abut second members 40, with the CD jewel box resting on upper surface 21 of ledge portion 23 of first member 20. As shown in FIG. 5, CD jewel boxes 5 mounted in storage system 10 are separated by spaces 14 but partially overlap second members 40.

Removal of CD jewel boxes is essentially a reverse procedure. By virtue of spaces 14 between adjacent CD jewel boxes, a jewel box may be gripped on each of its left and right edges to pull the bottom edge of the box outward, whereby the top edge may then be removed from recess 24 of the first member 20 to clear lip 25.

Various modifications may be made to the preferred embodiments without departing from the spirit and scope of the invention. For example, as shown in FIG. 6, a lip 28 may be formed on an upper surface 21' of the ledge portion 23' of an alternate first member 20'. Lip 28 would function to prevent the lower edge of a CD jewel box from sliding forward accidentally. Additional spacing between the upper and lower surfaces 21', 22' of adjacent rows of first members may be required in this alternate embodiment to enable jewel boxes to be more easily inserted and removed.

As another alternative, the male and female connectors may be reversed between first and second members 20, 40. Also, male and female connectors may both be utilized on a given member at one time. Moreover, male and female connectors may also be disposed on other surfaces of members 20, 40 (e.g., with female connectors on end surfaces of second members 40 and male connectors on upper and lower surfaces of first members 20). First and second members 20, 40 may also have different profiles, and may be oriented in opposite orientations with ledges defined instead on the second members. Furthermore, first and second members 20, 40 may also be arranged at other inclinations (e.g., 45 degrees from vertical), with cooperative ledge portions on both members to provide a diamond-shaped receptacle.

As another alternative, it is contemplated that storage systems may be constructed in three dimensional arrangements, e.g., with selected first members that are coupled to a common second member oriented orthogonal to one another through a horizontal plane. In addition, the cross-sectional profiles of the pins and apertures in the male and female connectors may be varied, e.g., with circular or polygonal cross-sections, to permit other relative angular orientations of first members coupled to a common second member, and thereby enable a wide variety of three dimensional configurations to be obtained.

Other modifications will be apparent to one skilled in the art. Therefore, it will be appreciated that the invention lies solely in the claims hereinafter appended.

What is claimed is:

1. A modular storage system comprising:
   a plurality of longitudinal first members, each of the first members having female connectors;
   a plurality of longitudinal second members, each of the second members having male connectors; and
   wherein the first and second members extend longitudinally orthogonal to one another, and the first and second members are removably coupled to one another by inserting male connectors into the female connectors, connections between the male and female connectors are arranged and configured such that one of the first members is capable of orthogonally connecting to at least two second members, and that one of the second members is capable of orthogonally connecting to at least two first members, the first and second members are capable of forming a 2-D lattice structure which includes a plurality of receptacles, each of the receptacles is formed by two first members and two second members wherein the first and second members are pivotally coupled to one another such that the first and second members are capable of forming a 3-D lattice structure.

2. The storage system of claim 1, wherein each said first member comprises a female connector disposed at each end, and wherein each said second member comprises a male connector disposed at each end.

3. The storage system of claim 2, wherein the female connectors on each said first member comprises a pair of apertures spaced longitudinally along the first member, and wherein the male connectors on each said second member comprises a pair of pins, wherein the apertures and pins in each said female and male connector are spaced relative one another and the ends of the first and second members such that the male connector of each said second member selectively engages either one first member with both pins of the second member engaging both apertures of the first member, or two first members with one pin of the second member engaging one aperture of each of the two first members.

4. The storage system of claim 2, wherein the male connectors on each said second member include at least one longitudinally-extending pin, and wherein the pin at a first end of each said second member is hollowed out to define an aperture in the end thereof that is sized to receive the pin at a second end of the second member; whereby a pair of second members engaging the female connector of the first member further engage one another through the male connectors thereof.

5. The storage system of claim 4, wherein the female connectors of each said first member comprises an aperture extending through the first member, the aperture sized on opposing surfaces of the first member to receive the pins at the first and second ends of each said second member, each said first member defining a shoulder within each said aperture that abuts the pin at the first end of each said second member.

6. The storage system of claim 4, wherein the pins at the first and second ends of each said second member each include detents to maintain the first and second members in frictional engagement.

7. The storage system of claim 1, wherein the female connectors on each said first member are disposed proximate a rear portion of the first member, wherein each said first member includes a ledge portion extending forward from the female connectors, the ledge portion sized relative to the second members to also extend forward from the second members.

8. The storage system of claim 7, wherein the first and second members are sized to for a receptacle for individual articles between adjacent pairs of first members and adjacent pairs of second members.

9. The storage system of claim 8, wherein the first and second members are sized to for a receptacle for individual compact disc jewel boxes between adjacent said pairs of first members and adjacent said pairs of second members.

10. The storage system of claim 8, wherein the first members are sized such that articles stored in the storage system partially overlap adjacent said second members with spacings between adjacent said articles.

11. The storage system of claim 10, wherein the first members extend horizontally and the second members extend vertically, and wherein the first members are sized to form a receptacle such that adjacent articles supported between a pair of said first members are spaced from one another to permit the articles to be gripped on opposing edges thereof.

12. The storage system of claim 11, wherein each said first member further comprises a longitudinal recess defined on a lower surface of the ledge portion, the longitudinal recess receiving a top edge of an article.

13. The storage system of claim 12, wherein each said first member further comprises a longitudinal lip defined on an upper surface of the ledge portion.

14. A modular storage system comprising:
(a) a plurality of first members, each said first member including a female connector proximate opposing ends thereof, each said female connector including an aperture extending between upper and lower surfaces of the first member; and
(b) a plurality of second members, each said second member including a male connector proximate opposing ends thereof, each said male connector including a longitudinally-extending pin, with the pin proximate a first end of one second member disposed in the aperture and hollowed out to define an aperture in an end thereof which is sized to receive the pin at a second end of another second member.

15. The storage system of claim 14, wherein the aperture in each said female connector of each said first member is sized on the lower and upper surfaces of the first member to respectively receive the pins at the first and second ends of each said second member, and wherein each said first member defines a shoulder within each said aperture that abuts the pin at the first end of each said second member.

16. A modular storage system comprising:
(a) a plurality of first members, each said first member including a female connector proximate opposing ends thereof , each said female connector including an a perture extending between upper and lower surfaces of the first member; and
(b) a plurality of second members, each said second member including a male connector proximate opposing ends thereof, each said male connector including a longitudinally-extending pin, with the pin proximate a first end of one second member hollowed out to define an aperture in an end thereof which is sized to receive the pin at a second end of another second member;
wherein the pins at the first and second ends of each second member each comprise detents to maintain the first and second members in frictional engagement.

17. A modular storage system comprising:
(a) a plurality of longitudinal first members, each first member including a female connector proximate opposing ends thereof, each said female connector including a pair of apertures longitudinally-spaced from one another; and
(b) a plurality of longitudinal second members, each second member including a male connector proximate opposing ends thereof, each said male connector including a pair longitudinally-extending pins, wherein the male connector of each said second member selectively engages either one of said first member with both pins of the male connector engaging both apertures of said female connector on the first member, or two first members with one of said pins of the male connector engaging one of said apertures in a female connector on each of the two first members.

18. The modular storage system of claim 17, wherein the pins in the male connector proximate a first end of each second member are each hollowed out to define an aperture in an end thereof which is sized to receive one of the pins in the male connector at a second end of the second member.

19. The storage system of claim 18, wherein the aperture in each said female connector of each said first member extends between lower and upper surfaces of the first member, and wherein each said aperture in each female connector is sized on the lower and upper surfaces of the first member to respectively receive one of the pins at the first and second ends of each said second member, and wherein each said first member defines a shoulder within each said aperture that abuts one of the pins at the first end of each second member.

20. The storage system of claim 17, wherein the pins at the first and second ends of each said second member each comprise detents to maintain the first and second members in frictional engagement.

21. A modular storage system comprising:

a plurality of longitudinal first members, each of the first members having female connectors;

a plurality of longitudinal second members, each of the second members having male connectors; and wherein the first and second members extend longitudinally orthogonal to one another, and the first and second members are removably coupled to one another by inserting male connectors into the female connectors, connections between the male and female connectors are arranged and configured such that one of the first members is capable of connecting to at least two second members, and that one of the second members is capable of connecting to at least two first members, the first and second members are capable of forming a 2-D lattice structure which includes a plurality of receptacles, each of the receptacles is formed by two first members disposed opposite from each other and two second members disposed opposite from each other wherein the first and second members are pivotally coupled to one another such that the first and second members are capable of forming a 3-D lattice structure.

\* \* \* \* \*

UNITED STATES PATENT AND TRADEMARK OFFICE
CERTIFICATE OF CORRECTION

PATENT NO.   : 6,015,050
DATED        : January 18, 2000
INVENTOR(S)  : Gilbertson It is certified that error appears in the above-identified patent and that said Letters Patent is hereby corrected as shown below:

<u>Title page,</u>
Item [56] References Cited, U.S. Patent Documents:
Insert -- 4,600,110 7/1986   Timor 211/120
         5,148,925 9/1992   Althoff 211/41 --

<u>Column 3,</u>
Lines 3-4, "member of FIG. 3A" should read -- embodiment of the second member. --
Line 4, insert -- FIG. 3C" is a bottom plan view of a third embodiment of the second member. --

<u>Column 4,</u>
Line 44, "in addition" should read -- In addition --

<u>Column 6,</u>
Line 45, after "circular", please insert -- (see examples in FIGS. 3C' and 3C") --

<u>Column 8,</u>
Line 39, "a perture" should read -- aperture --

Signed and Sealed this

Fourth Day of September, 2001

Attest:

*Attesting Officer*

NICHOLAS P. GODICI
*Acting Director of the United States Patent and Trademark Office*